(12) United States Patent
Faccin et al.

(10) Patent No.: US 9,042,401 B1
(45) Date of Patent: May 26, 2015

(54) APPLICATION-LAYER MECHANISM TO ENABLE POWER ENHANCEMENTS IN MULTI-ACCESS SCENARIOS

(75) Inventors: Stefano Faccin, Fremont, CA (US); Mahesh Subramanian, Bangalore (IN)

(73) Assignee: Marvell International Ltd., Hamilton (BM)

( * ) Notice: Subject to any disclaimer, the term of this patent is extended or adjusted under 35 U.S.C. 154(b) by 1606 days.

(21) Appl. No.: 12/175,730

(22) Filed: Jul. 18, 2008

Related U.S. Application Data

(60) Provisional application No. 60/950,468, filed on Jul. 18, 2007.

(51) Int. Cl.
| | | |
|---|---|---|
| H04L 12/66 | (2006.01) | |
| H04W 36/00 | (2009.01) | |
| H04W 36/14 | (2009.01) | |
| H04W 24/00 | (2009.01) | |
| H04W 48/16 | (2009.01) | |
| H04W 36/18 | (2009.01) | |
| H04W 80/04 | (2009.01) | |

(52) U.S. Cl.
CPC .......... *H04W 36/0011* (2013.01); *H04W 24/00* (2013.01); *H04W 48/16* (2013.01); *H04W 36/18* (2013.01); *H04W 80/04* (2013.01); *H04W 36/14* (2013.01)

(58) Field of Classification Search
CPC ..... H04W 88/06; H04W 48/18; H04W 84/12; H04M 2250/06
USPC ............ 370/252, 331, 463; 455/435.2, 553.1
See application file for complete search history.

(56) References Cited

U.S. PATENT DOCUMENTS

| 7,180,876 B1* | 2/2007 | Henry et al. .................. 370/329 |
|---|---|---|
| 2004/0156338 A1* | 8/2004 | Pasanen et al. ............... 370/331 |
| 2004/0264414 A1* | 12/2004 | Dorenbosch .................. 370/332 |
| 2005/0108393 A1* | 5/2005 | Banerjee et al. .............. 709/225 |
| 2005/0288019 A1* | 12/2005 | Park et al. ..................... 455/436 |
| 2006/0200542 A1* | 9/2006 | Willig ........................... 709/223 |
| 2008/0057892 A1* | 3/2008 | Taaghol ..................... 455/187.1 |

OTHER PUBLICATIONS

3GPP document ,"TS 123 206 v.7.2.0", Mar. 2007.*
3GPP TS 23.279 V8.1.0 (Sep. 2007); 3$^{rd}$ Generation Partnership Project; Technical Specification Group Services and System Aspects; Combining Circuit Switched (CS) and IP Multimedia Subsystem (IMS) services; Stage 2 (Release 8); 35 pages.

(Continued)

*Primary Examiner* — Redentor Pasia
*Assistant Examiner* — Salvador E Rivas

(57) ABSTRACT

A wireless device comprises a first wireless interface, a second wireless interface, and a power control module. The first wireless interface is configured to communicate with a first access network. The second wireless interface is configured to communicate with a second access network. One of the first and second wireless interfaces comprises a circuit-switched interface. The other one of the first and second wireless interfaces comprises a packet-switched interface. The power control module selectively disables the first wireless interface, provides registration information with respect to the first wireless interface to a remote system, and updates the registration information in the remote system prior to disabling the first wireless interface.

27 Claims, 7 Drawing Sheets

(56) References Cited

OTHER PUBLICATIONS

3GPP TS 23.206 V7.5.0 (Dec. 2007); 3$^{rd}$ Generation Partnership Project; Technical Specification Group Services and System Aspects; Voice Call Continuity (VCC) between Circuit Switched (CS) and IP Multimedia Subsystems (IMS); Stage 2 (Release 7); 36 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

\* cited by examiner

APPLICATION-LAYER MECHANISM TO ENABLE POWER ENHANCEMENTS IN MULTI-ACCESS SCENARIOS

CROSS-REFERENCE TO RELATED APPLICATIONS

This application claims the benefit of U.S. Provisional Application No. 60/950,468, filed on Jul. 18, 2007. The disclosure of the above application is incorporated herein by reference in its entirety.

FIELD

The present disclosure relates to multiple network access interfaces and more particularly to power enhancements for multiple network access interfaces.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a communications system 102 is presented. User equipment (UE) 104 establishes connections with a 3rd generation partnership project (3GPP) network 106 and a non-3GPP network 108. The non-3GPP network 108 maintains a communications link with the Internet 110. The 3GPP network 106 may establish links with other user equipment and provide communication between various user equipment, including the user equipment 104.

The 3GPP network 106 may maintain a link with the public switched telephone network (PSTN) 112 and/or other service providers 114. The other service providers 114 may also maintain 3GPP networks. For example only, the user equipment 104 may include a mobile phone or a laptop with voice capability. The user equipment 104 may transmit and receive packet data to and from the Internet 110 via the non-3GPP network 108. For example, the user equipment 104 can display web pages from the Internet 110 via the non-3GPP network 108. The user equipment 104 transmits and receives circuit-switched voice data over the 3GPP network 106.

SUMMARY

A wireless device comprises a first wireless interface, a second wireless interface, and a power control module. The first wireless interface is configured to communicate with a first access network. The second wireless interface is configured to communicate with a second access network. One of the first and second wireless interfaces comprises a circuit-switched interface. The other one of the first and second wireless interfaces comprises a packet-switched interface. The power control module selectively disables the first wireless interface, provides registration information with respect to the first wireless interface to a remote system, and updates the registration information in the remote system prior to disabling the first wireless interface.

The first wireless interface comprises a circuit-switched cellular interface. The second wireless interface comprises a packet-switched wireless local area network interface. The power control module performs the registration and the updating of the registration information via the first access network. The power control module disables the first wireless interface when the first wireless interface is unused for at least a predetermined period of time.

The predetermined period of time is adjustable based on a battery state of the wireless device. The power control module updates the registration information by replacing information corresponding to the first wireless interface with information corresponding to the second wireless interface. The power control module periodically enables the first wireless interface to maintain communication with the first access network. The power control module enables the first wireless interface when data for the first wireless interface is received over the second wireless interface.

The power control module provides registration information with respect to the second wireless interface to the remote system after communication between the second wireless interface and the second access network is established. The updating of the registration information causes the remote system to forward data destined for the first wireless interface to the second wireless interface. The power control module cancels the forwarding in the remote system when the power control module re-enables the first wireless interface.

A communication controller comprises a power control module configured to control a first wireless control module and a second wireless control module. The first and second wireless control modules are configured to communicate with a circuit-switched interface and a packet-switched interface respectively. The power control module is further configured to forward respective registration information associated with the circuit-switched interface and the packet-switched interface to a remote system. The circuit-switched interface and the packet-switched interface are used to communicate with a first access network and a second access network respectively. The power control module controls the first wireless control module to selectively disable the circuit-switched interface based on a level of communication activities between the first access network and the circuit-switched interface. When the circuit-switched interface is disabled, data destined for the circuit-switched interface is forwarded to the packet-switched interface.

The power control module is further configured to update the registration information for the circuit-switched interface in the remote system prior to the power control module disabling the circuit-switched interface via the first wireless control module. The registration information for the circuit-switched interface is updated with the registration information for the packet-switched interface. The power control module is further configured to perform the forwarding and the updating of the registration information with respect to the circuit-switched interface via the first access network.

The updating of the registration information with respect to the circuit-switched interface causes the remote system to forward data destined for the circuit-switched interface to the packet-switched interface. The power control module is further configured to cancel the forwarding in the remote system when the circuit-switched interface is re-enabled. The power control module is further configured to disable the circuit-switched interface via the first wireless control module when the level of communication activities is determined to be below a predetermined limit. The predetermined limit is adjustable based on a power state of a wireless device associated with the communication controller.

The power control module periodically enables the circuit-switched interface via the first wireless control module to maintain communication with the first access network. When the circuit-switched interface is in a disabled state, the power control module enables the circuit-switched interface via the first wireless control module when it is determined that data for the circuit-switched interface is received over the packet-switched interface. A wireless device incorporates the communication controller.

A wireless device comprises first wireless interface means, second wireless interface means, and power control means. The first wireless interface means is for communicating with a first access network. The second wireless interface means is for communicating with a second access network. One of the first and second wireless interfaces comprises a circuit-switched interface. The other one of the first and second wireless interfaces comprises a packet-switched interface. The power control means is for selectively disabling the first wireless interface means, for providing registration information with respect to the first wireless interface means to a remote system, and for updating the registration information in the remote system prior to disabling the first wireless interface means.

The first wireless interface means comprises a circuit-switched cellular interface. The second wireless interface means comprises a packet-switched wireless local area network interface. The power control means performs the registration and the updating of the registration information via the first access network. The power control means disables the first wireless interface means when the first wireless interface means is unused for at least a predetermined period of time. The predetermined period of time is adjustable based on a battery state of the wireless device.

The power control means updates the registration information by replacing information corresponding to the first wireless interface means with information corresponding to the second wireless interface means. The power control means periodically enables the first wireless interface means to maintain communication with the first access network. The power control means enables the first wireless interface means when data for the first wireless interface means is received over the second wireless interface means.

The power control means provides registration information with respect to the second wireless interface means to the remote system after communication between the second wireless interface means and the second access network is established. The updating of the registration information causes the remote system to forward data destined for the first wireless interface means to the second wireless interface means. The power control means cancels the forwarding in the remote system when the power control means re-enables the first wireless interface means.

A communication controller comprises power control means for controlling a first wireless control module and a second wireless control module. The first and second wireless control modules are configured to communicate with a circuit-switched interface and a packet-switched interface, respectively. The power control means is also for forwarding respective registration information associated with the circuit-switched interface and the packet-switched interface to a remote system. The circuit-switched interface and the packet-switched interface are used to communicate with a first access network and a second access network respectively. The power control means controls the first wireless control module to selectively disable the circuit-switched interface based on a level of communication activities between the first access network and the circuit-switched interface. When the circuit-switched interface is disabled, data destined for the circuit-switched interface is forwarded to the packet-switched interface.

The power control means is further configured to update the registration information for the circuit-switched interface in the remote system prior to the power control means disabling the circuit-switched interface via the first wireless control module. The registration information for the circuit-switched interface is updated with the registration information for the packet-switched interface. The power control means is further configured to perform the forwarding and the updating of the registration information with respect to the circuit-switched interface via the first access network.

The updating of the registration information with respect to the circuit-switched interface causes the remote system to forward data destined for the circuit-switched interface to the packet-switched interface. The power control means is further configured to cancel the forwarding in the remote system when the circuit-switched interface is re-enabled. The power control means is further configured to disable the circuit-switched interface via the first wireless control module when the level of communication activities is determined to be below a predetermined limit. The predetermined limit is adjustable based on a power state of a wireless device associated with the communication controller.

The power control means periodically enables the circuit-switched interface via the first wireless control module to maintain communication with the first access network. When the circuit-switched interface is in a disabled state, the power control means enables the circuit-switched interface via the first wireless control module when it is determined that data for the circuit-switched interface is received over the packet-switched interface. A wireless device incorporates the communication controller.

A method comprises selectively establishing wireless communication between a first wireless interface and a first access network; selectively establishing wireless communication between a second wireless interface and a second access network; providing registration information with respect to the first wireless interface to a remote system; selectively disabling the first wireless interface; and updating the registration information in the remote system prior to disabling the first wireless interface. One of the first and second wireless interfaces comprises a circuit-switched interface. The other one of the first and second wireless interfaces comprises a packet-switched interface The first wireless interface comprises a circuit-switched cellular interface. The second wireless interface comprises a packet-switched wireless local area network interface. The method further comprises performing the providing and the updating of the registration information via the first access network. The method further comprises disabling the first wireless interface when the first wireless interface is unused for at least a predetermined period of time. The predetermined period of time is adjustable based on a battery state.

The method further comprises updating the registration information by replacing information corresponding to the first wireless interface with information corresponding to the second wireless interface. The method further comprises periodically enabling the first wireless interface to maintain communication with the first access network. The method further comprises enabling the first wireless interface when data for the first wireless interface is received over the second wireless interface.

The method further comprises providing registration information with respect to the second wireless interface to the remote system after communication between the second wireless interface and the second access network is established. The updating of the registration information causes the remote system to forward data destined for the first wireless interface to the second wireless interface. The method further comprises cancelling the forwarding in the remote system when the first wireless interface is re-enabled.

A method comprises controlling a first wireless control module and a second wireless control module, the first and second wireless control modules configured to communicate with a circuit-switched interface and a packet-switched interface respectively. The circuit-switched interface and the packet-switched interface are used to communicate with a first access network and a second access network respectively. The method further comprises forwarding respective registration information associated with the circuit-switched interface and the packet-switched interface to a remote system; controlling the first wireless control module to selectively disable the circuit-switched interface based on a level of communication activities between the first access network and the circuit-switched interface; and causing data destined for the circuit-switched interface to be forwarded to the packet-switched interface when the circuit-switched interface is disabled.

The method further comprises updating the registration information for the circuit-switched interface in the remote system prior to disabling the circuit-switched interface via the first wireless control module. The registration information for the circuit-switched interface is updated with the registration information for the packet-switched interface. The method further comprises performing the forwarding and the updating of the registration information with respect to the circuit-switched interface via the first access network.

The updating of the registration information with respect to the circuit-switched interface causes the remote system to forward data destined for the circuit-switched interface to the packet-switched interface. The method further comprises cancelling the forwarding in the remote system when the circuit-switched interface is re-enabled. The method further comprises disabling the circuit-switched interface via the first wireless control module when the level of communication activities is determined to be below a predetermined limit.

The predetermined limit is adjustable based on a power state of a battery. The method further comprises periodically enabling the circuit-switched interface via the first wireless control module to maintain communication with the first access network. The method further comprises, when the circuit-switched interface is in a disabled state, enabling the circuit-switched interface via the first wireless control module when it is determined that data for the circuit-switched interface is received over the packet-switched interface.

A computer program stored on a computer-readable medium for use by a processor comprises selectively establishing wireless communication between a first wireless interface and a first access network; selectively establishing wireless communication between a second wireless interface and a second access network; providing registration information with respect to the first wireless interface to a remote system; selectively disabling the first wireless interface; and updating the registration information in the remote system prior to disabling the first wireless interface. One of the first and second wireless interfaces comprises a circuit-switched interface. The other one of the first and second wireless interfaces comprises a packet-switched interface The first wireless interface comprises a circuit-switched cellular interface. The second wireless interface comprises a packet-switched wireless local area network interface. The computer program further comprises performing the providing and the updating of the registration information via the first access network. The computer program further comprises disabling the first wireless interface when the first wireless interface is unused for at least a predetermined period of time. The predetermined period of time is adjustable based on a battery state.

The computer program further comprises updating the registration information by replacing information corresponding to the first wireless interface with information corresponding to the second wireless interface. The computer program further comprises periodically enabling the first wireless interface to maintain communication with the first access network. The computer program further comprises enabling the first wireless interface when data for the first wireless interface is received over the second wireless interface.

The computer program further comprises providing registration information with respect to the second wireless interface to the remote system after communication between the second wireless interface and the second access network is established. The updating of the registration information causes the remote system to forward data destined for the first wireless interface to the second wireless interface. The computer program further comprises cancelling the forwarding in the remote system when the first wireless interface is re-enabled.

A computer program stored on a computer-readable medium for use by a processor comprises controlling a first wireless control module and a second wireless control module, the first and second wireless control modules configured to communicate with a circuit-switched interface and a packet-switched interface respectively. The circuit-switched interface and the packet-switched interface are used to communicate with a first access network and a second access network respectively. The computer program further comprises forwarding respective registration information associated with the circuit-switched interface and the packet-switched interface to a remote system; controlling the first wireless control module to selectively disable the circuit-switched interface based on a level of communication activities between the first access network and the circuit-switched interface; and causing data destined for the circuit-switched interface to be forwarded to the packet-switched interface when the circuit-switched interface is disabled.

The computer program further comprises updating the registration information for the circuit-switched interface in the remote system prior to disabling the circuit-switched interface via the first wireless control module. The registration information for the circuit-switched interface is updated with the registration information for the packet-switched interface. The computer program further comprises performing the forwarding and the updating of the registration information with respect to the circuit-switched interface via the first access network.

The updating of the registration information with respect to the circuit-switched interface causes the remote system to forward data destined for the circuit-switched interface to the packet-switched interface. The computer program further comprises cancelling the forwarding in the remote system when the circuit-switched interface is re-enabled. The computer program further comprises disabling the circuit-switched interface via the first wireless control module when the level of communication activities is determined to be below a predetermined limit.

The predetermined limit is adjustable based on a power state of a battery. The computer program further comprises periodically enabling the circuit-switched interface via the first wireless control module to maintain communication with the first access network. The computer program further comprises, when the circuit-switched interface is in a disabled state, enabling the circuit-switched interface via the first wireless control module when it is determined that data for the circuit-switched interface is received over the packet-switched interface.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
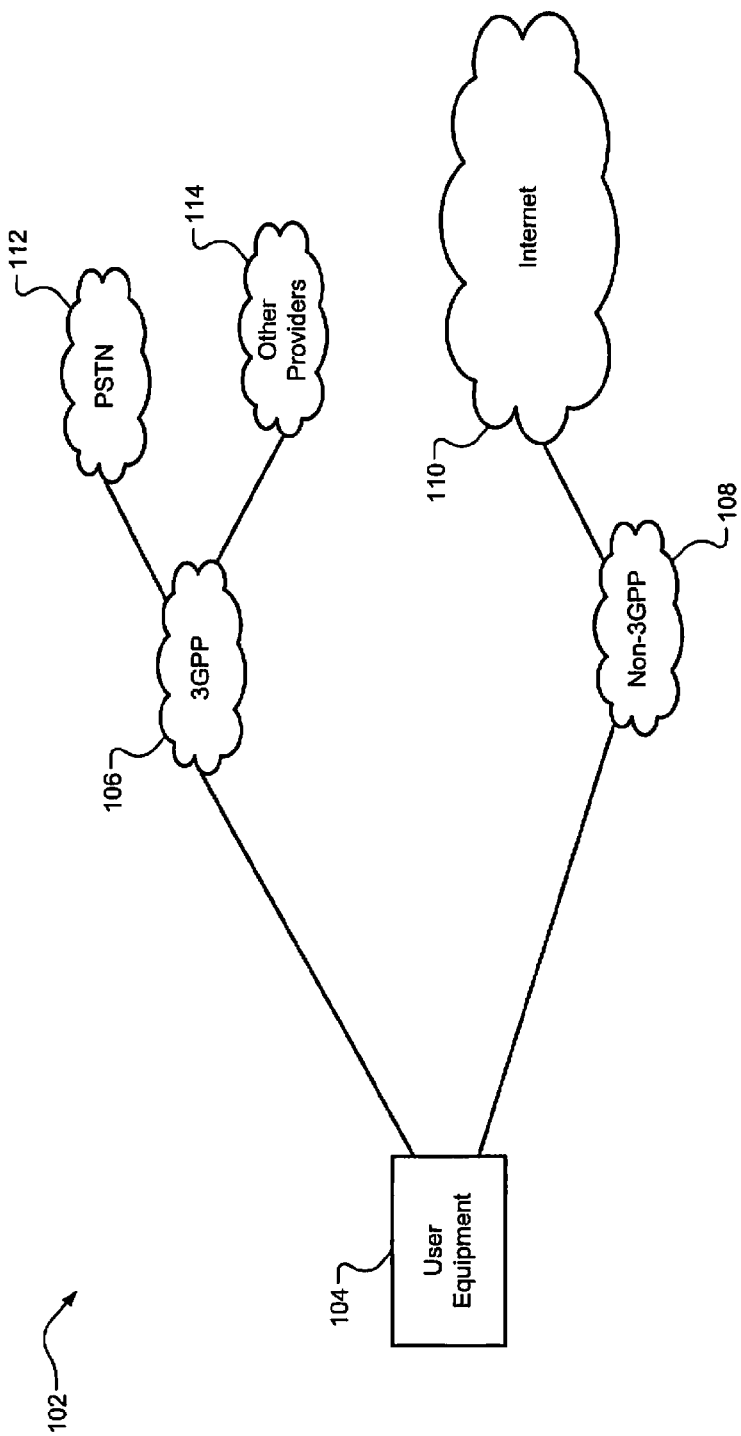
FIG. 1 is a functional block diagram of a communications system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
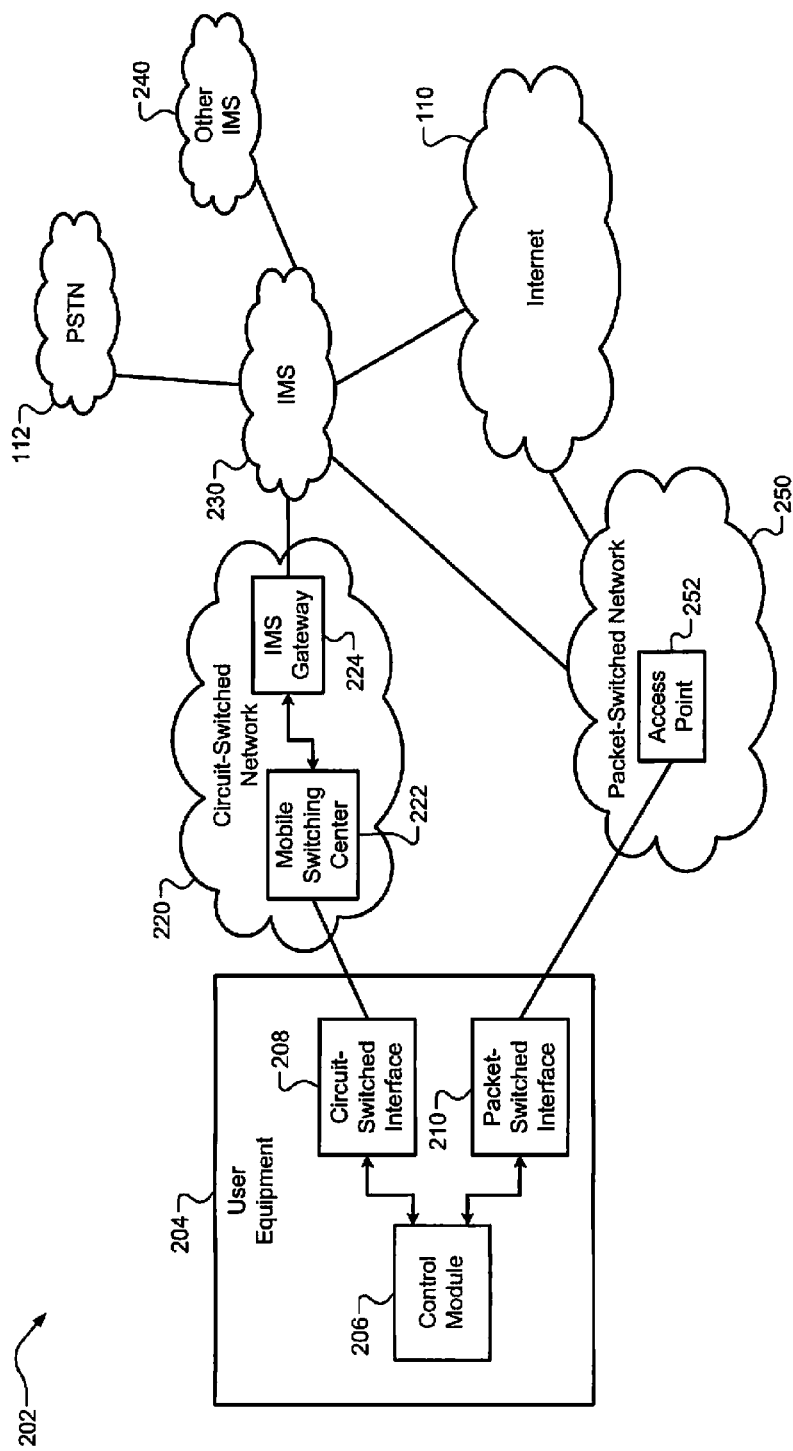
FIG. 2 is a functional block diagram of an exemplary communications system according to the principles of the present disclosure.

Referring now to FIG. 2, a functional block diagram of an exemplary communications system 202 is presented. User equipment 204 includes a control module 206, a circuit-switched interface 208, and a packet-switched interface 210. The circuit-switched interface 208 establishes a link with a circuit-switched network 220. The circuit-switched network 220 may include, for example, a cellular network, a 3GPP network, and/or a Global System for Mobile communications (GSM) network.

The circuit-switched network 220 may include a mobile switching center (MSC) 222, which communicates with the circuit-switched interface 208. The MSC 222 may maintain registration information for user equipment associated with the circuit-switched network 220, including the user equipment 204. The MSC 222 may route calls between users associated with the circuit-switched network 220.

For some or all associated user equipment, the MSC 222 may forward call requests to and receive instructions from an Internet protocol (IP) multimedia system (IMS) gateway 224. The IMS gateway 224 communicates with an IMS 230. The IMS 230 may coordinate calls and provision of other services over the circuit-switched network 220.

In various implementations, the IMS gateway 224 may convert call set-up requests from the MSC 222 within the circuit-switched network 220 into IMS requests that are forwarded to the IMS 230. In this way, the IMS 230 can coordinate some or all calls using the circuit-switched network 220.

The IMS 230 may also service calls from the PSTN 112 and/or other IMS providers 240. In addition, the IMS 230 may service calls via packet-switched networks, such as by using the Voice over Internet Protocol (VoIP). For example, VoIP communications may include calls from dedicated IP phones and calls from software-based phones running on computers, including applications such as Skype. The IMS 230 may communicate with the Internet 110 and with a packet-switched network 250. In various implementations, the packet-switched network 250 and the Internet 110 may overlap, meaning that various resources within the packet-switched network 250 are part of the Internet 110.

The packet-switched interface 210 of the user equipment 204 may establish a wireless link with an access point 252 of the packet-switched network 250. For example only, this wireless link may include wireless local area networks (such as Wi-Fi or IEEE 802.11) and/or wireless metro area networks (such as WiMAX or IEEE 802.16).

For example only, the user equipment 204 may normally use the circuit-switched network 220 for voice traffic and the packet-switched network 250 for data traffic. In order to reduce power consumption of the user equipment 204, the circuit-switched interface 208 and/or the packet-switched interface 210 may be powered down. This may be especially important when the user equipment 204 is operating on battery power.

For example only, if no call has been made over the circuit-switched interface 208 for a predetermined period of time, the circuit-switched interface 208 may be powered down. Depending upon the requirements of the wireless link between the circuit-switched interface 208 and the circuit-switched network 220, the circuit-switched interface 208 may need to be periodically powered on in order to preserve the registration of the user equipment 204 with the MSC 222.

In addition, the circuit-switched interface 208 may need to be powered on to accommodate changes in position of the user equipment 204. For example, as the signal from one base station gets weaker and the signal from another base station gets stronger, the circuit-switched interface 208 may cooperate in handing off the wireless link from one base station to the other.

When one of the interfaces 208 and 210 is powered down, registration information in the IMS 230 can be updated so that calls and/or other information can be provided to the interface that is still powered on. For example, the circuit-switched interface 208 may register with the IMS 230. Before the circuit-switched interface 208 is powered down, registration with the IMS 230 can be updated to instead direct calls to the packet-switched interface 210.

Alternatively, both the circuit-switched interface 208 and the packet-switched interface 210 may be registered with the IMS 230. Then, before the circuit-switched interface 208 is powered down, call forwarding may be set up in the IMS 230 to forward the circuit-switched calls to the packet-switched network 250.

When the circuit-switched interface 208 is powered down and a circuit-switched call is received over the packet-switched interface 210, the control module 206 may power up the circuit-switched interface 208. The call may then be forwarded from the IMS 230 to the circuit-switched interface 208. Alternatively, once the circuit-switched interface 208 is powered up, the circuit-switched interface 208 may initiate a call to the IMS 230, at which point the two calls are linked together. In order to allow this alternative option, the IMS 230 may transmit its network address to the packet-switched interface 210 along with the forwarded circuit-switched calls.

Figure 3:
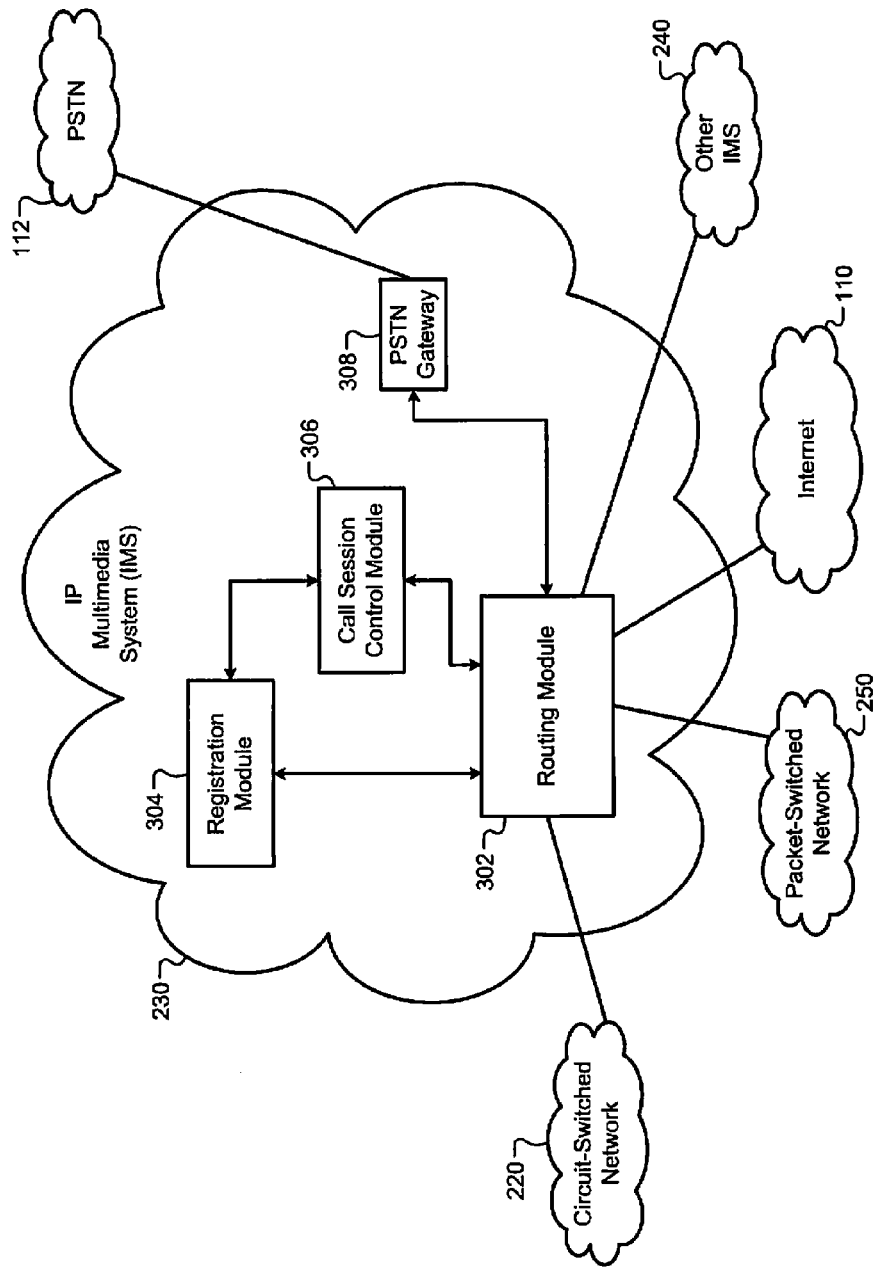
FIG. 3 is a functional block diagram of an exemplary implementation of an internet protocol multimedia system according to the principles of the present disclosure.
Figure 4:
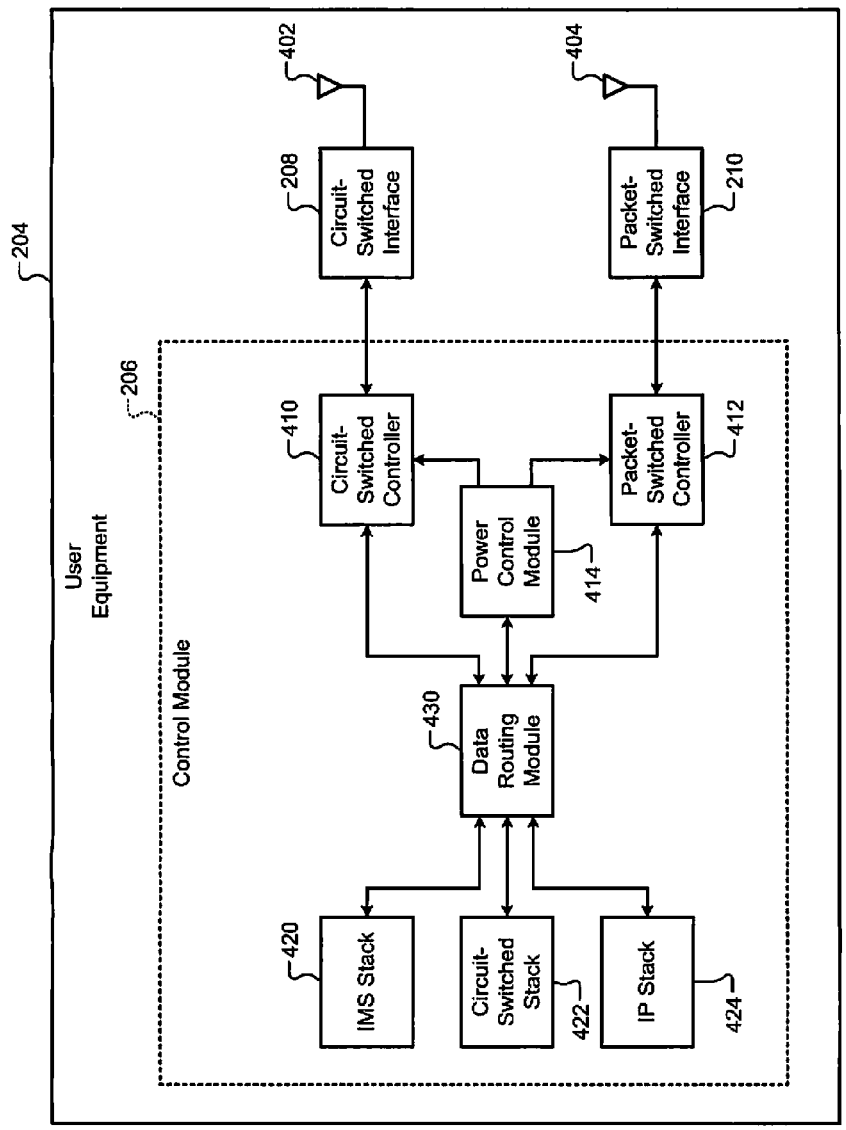
FIG. 4 is a functional block diagram of an exemplary implementation of the user equipment according to the principles of the present disclosure.
Figure 5:
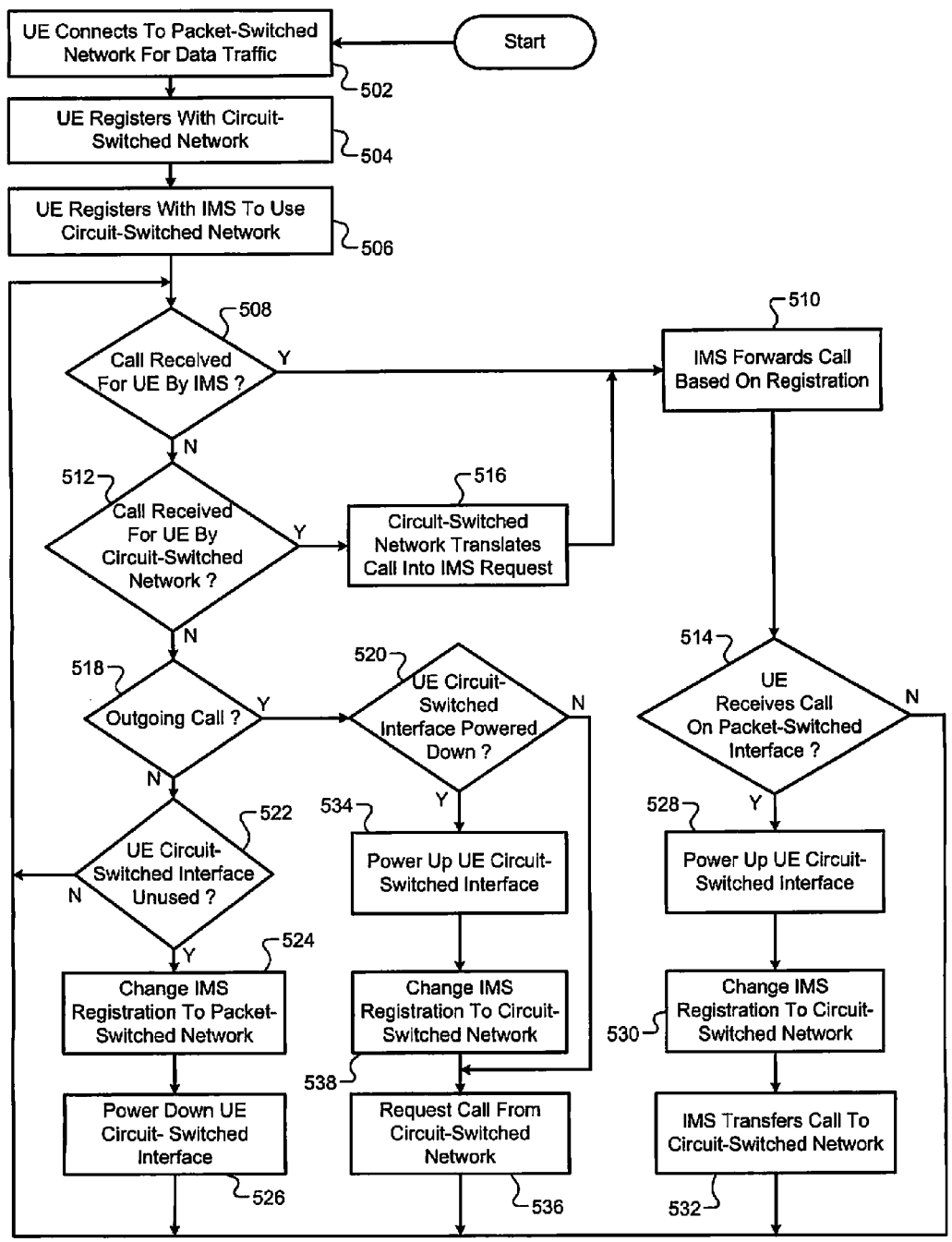
FIGS. 5 and 6 are flowcharts depicting exemplary steps performed by the communications system of FIG. 2 according to the principles of the present disclosure.
Figure 6:
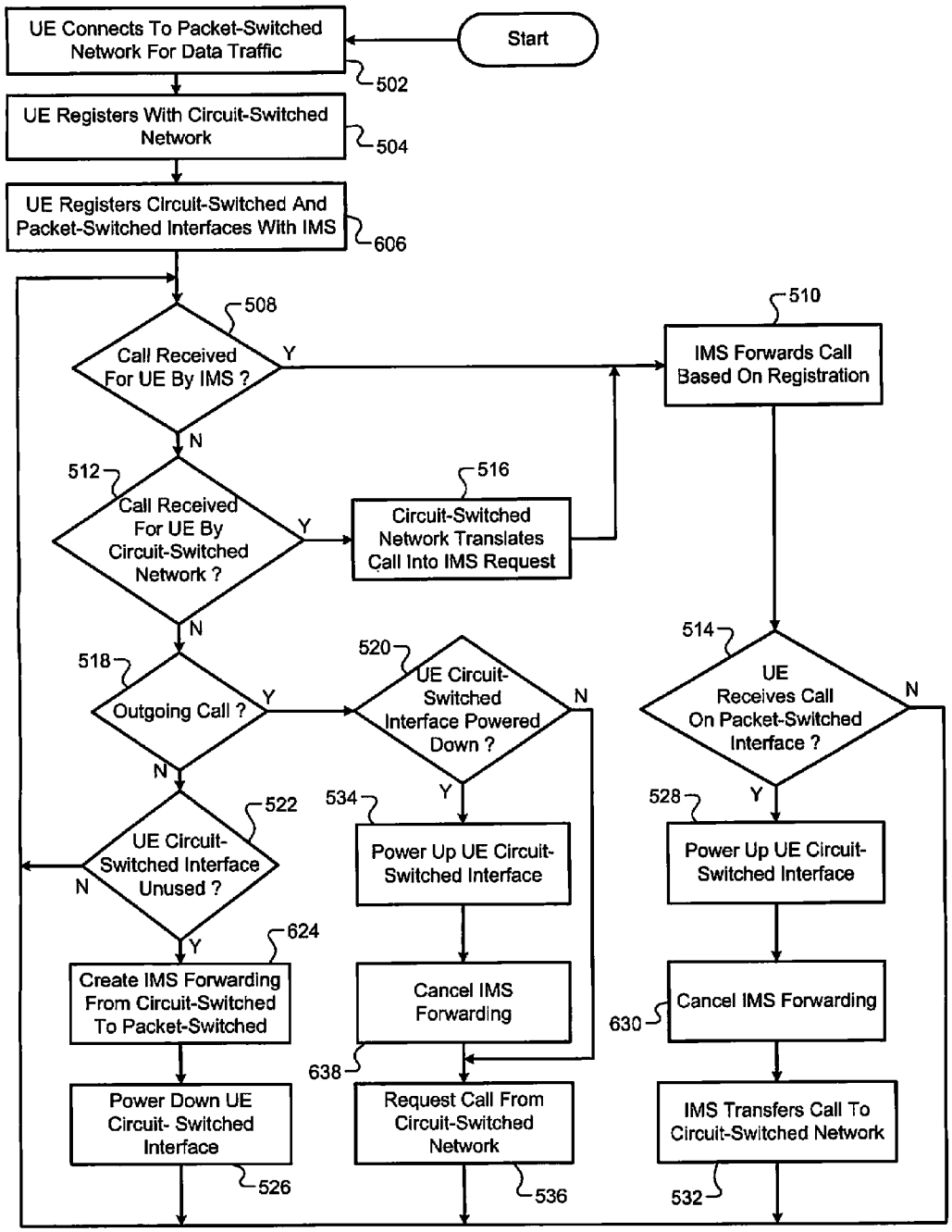

In either implementation, calls are still successfully routed and with minimum delay, even while reducing power consumption. In brief, FIG. 3 depicts a functional block diagram of the IMS 230 and FIG. 4 depicts a functional block diagram of the user equipment 204. FIGS. 5 and 6 depict exemplary operation of the communications system 202.

Referring back to FIG. 3, a functional block diagram of an exemplary implementation of the IMS 230 is depicted. The IMS 230 includes a routing module 302, a registration module 304, a call session control module 306, and a PSTN gateway 308. The routing module 302 routes calls and other information between the circuit-switched network 220, the packet-switched network 250, the Internet 110, the other IMS providers 240, and the PSTN gateway 308.

Additionally, the routing module 302 forwards IMS messages to the registration module 304 and the call session control module 306. For example, registration requests from the circuit-switched network 220 and the packet-switched network 250 may be forwarded to the registration module 304. The registration module 304 may include memory that stores information regarding registered devices.

As described above, the user equipment 204 of FIG. 2 may be registered one or more times with the registration module 304. For example only, the circuit-switched interface 208 may be registered with the registration module 304, or both the circuit-switched interface 208 and the packet-switched interface 210 may be registered with the registration module 304.

The call session control module 306 may coordinate receiving and forwarding calls based on information from the registration module 304. For example only, the call session control module 306 may receive call requests from the circuit-switched network 220. The call session control module 306 may configure the routing module 302 to route requested calls between various sources and the user equipment 204 of FIG. 2.

Alternatively, the call session control module 306 may send a control message to the circuit-switched network 220. The circuit-switched network 220 may then perform routing of the call based upon the control message. The registration module 304 may also include information such as call forwarding information. For example, as described above, call forwarding may be established from the registration for the circuit-switched interface 208 to the registration for the packet-switched interface 210.

Referring now to FIG. 4, a functional block diagram of an exemplary implementation of the user equipment 204 is presented. The circuit-switched interface 208 may transmit and receive data using a first antenna 402. The packet-switched interface 210 may transmit and receive data using a second antenna 404. In various implementations, the first and second antennas 402 and 404 may be combined. Communication may then be multiplexed between the circuit-switched interface 208 and the packet-switched interface 210.

The circuit-switched interface 208 is controlled by a circuit-switched controller 410. The packet-switched interface 210 is controlled by a packet-switched controller 412. A power control module 414 selectively transmits a powerdown signal to the circuit-switched controller 410 and/or the packet-switched controller 412. The circuit-switched controller 410 and the packet-switched controller 412 power down the circuit-switched interface 208 and the packet-switched interface 210 based upon the respective powerdown signals from the power control module 414.

The power control module 414 may track the usage of the circuit-switched controller 410 and the packet-switched controller 412. If a call has not been placed through the circuit-switched controller 410 for a predetermined period of time, the power control module 414 may transmit a powerdown signal to the circuit-switched controller 410. The power control module 414 may also transmit a powerdown signal to the packet-switched controller 412 when no packets have been passed through the packet-switched interface 210. During normal operation, the power control module 414 may avoid transmitting the powerdown signal to both the circuit-switched and packet-switched controllers 410 and 412.

The control module 206 may include an IMS stack 420, a circuit-switched stack 422, and an IP stack 424. The IMS stack 420, the circuit-switched stack 422, and the IP stack 424 may communicate with the circuit-switched controller 410 and the packet-switched controller 412 via a data routing module 430. Before the power control module 414 shuts down the circuit-switched controller 410, the power control module 414 may instruct the IMS stack 420 to send a message to the IMS 230. As described above, this message may change the registration of the user equipment 204 or may establish call forwarding from the circuit-switched registration to the packet-switched registration.

The circuit-switched stack 422 may establish a link with the circuit-switched network 220 of FIG. 2. The circuit-switched stack 422 may periodically instruct the power control module 414 to power up the circuit-switched controller 410 to maintain the link with the circuit-switched network 220. The IP stack 424 may transmit and receive packet data via the packet-switched interface 210. Web browsing and other application-layer functionality (not shown) of the user equipment 204 may use the IP stack 424 to provide these services. A user interface application (not shown) may communicate with the IMS stack 420 and the circuit-switched stack 422 to establish calls requested by a user of the user equipment 204 and to receive incoming calls.

Referring now to FIG. 5, a flowchart depicts exemplary steps performed by the communications system 202 of FIG. 2. Control begins in step 502 when the user equipment 204 is powered on or otherwise activated. In step 502, the user equipment 204 connects to the packet-switched network 240 for the transmission or reception of data traffic. Control continues in step 504, where the user equipment 204 registers with the circuit-switched network 220.

Control continues in step 506, where the user equipment 204 registers with the IMS 230, which will control calls over the circuit-switched network 220. For example only, the registration in step 504 may be with a mobile switching center of a GSM network, while the registration in step 506 may be with an IMS that will provide instructions to the mobile switching center 222.

Control continues in step 508, where control determines whether a call has been received for the user equipment 204 by the IMS 230. If so, control transfers to step 510; otherwise, control transfers to step 512. In step 510, the IMS 230 forwards the call based on the registration information. For example, the registration information may indicate that calls should be sent to the circuit-switched interface 208 of the user equipment 204. Alternatively, the registration may have been amended to transmit calls over the packet-switched interface 210. Control then continues in step 514.

In step 512, control determines whether a call has been received for the user equipment 204 over the circuit-switched network 220. If so, control transfers to step 516; otherwise, control transfers to step 518. In step 516, the circuit-switched network 220 translates the received call into an IMS request. The IMS request is forwarded to the IMS 230 and control continues in step 510.

In step 518, control determines whether an outgoing call is requested by the user equipment 204. If so, control transfers to step 520; otherwise, control transfers to step 522. In step 522, control determines whether the circuit-switched interface 208 of the user equipment 204 is unused. If so, control transfers to step 524; otherwise, control returns to step 508.

The determination of whether the circuit-switched interface 208 is unused may be based on the amount of time since a data transfer, such as a call, was last performed over the circuit-switched interface 208. If the amount of time is greater than a predetermined limit, the circuit-switched interface 208 may be considered unused. This predetermined limit may be adjusted as battery power available to the user equipment 204 decreases.

In step 524, the IMS registration is changed from the circuit-switched network 220 to the packet-switched network 240. This means that the IMS 230 will forward its calls to the packet-switched network 250 in step 510 instead of the circuit-switched network 220. For example, the IP address for the circuit-switched interface 208 may be replaced by the IP address for the packet-switched interface 210. Control continues in step 526, where the circuit-switched interface 208 of the user equipment 204 is powered down. Control then returns to step 508.

In step 514, control determines whether the user equipment 204 has received a call on the packet-switched interface 210. If so, this is an indication that the circuit-switched interface 208 is powered down, and control continues in step 528. Otherwise, the call is handled normally by the circuit-switched interface 208 and control returns to step 508. In step 528, the user equipment 204 powers up the circuit-switched interface 208 and control continues in step 530. In step 530, the IMS registration is changed back to a circuit-switched network 220.

Control continues in step 532, where the IMS 230 transfers the call to the circuit-switched network 220. For example only, two ways of transferring the call to the circuit-switched network 220 have been described. The IMS 230 may route the call over the circuit-switched network 220 to the circuit-switched interface 208. Alternatively, the circuit-switched interface 208 may initiate a call to the IMS 230 over the circuit-switched network 220. The two calls are then joined by the IMS. Once the circuit-switched interface 208 has handled the call, control returns to step 508.

In step 520, when an outgoing call is initiated, control determines whether the circuit-switched interface 208 is powered down. If so, control transfers to step 534; otherwise, control transfers to step 536. In step 534, control powers up the circuit-switched interface 208. Control then continues in step 538, where the IMS registration is changed to route calls to the circuit-switched network 220. Control continues in step 536, where the user equipment 204 transmits a call request to the circuit-switched network 220. As described above, the circuit-switched network 220 translates this request into an IMS request, which the IMS 230 uses to establish a call with the user equipment 204. Control then returns to step 508.

Referring now to FIG. 6, a flowchart depicts alternative exemplary operation of the communications system 202 of FIG. 2. Steps 506, 524, 530, and 538 have been replaced with steps 606, 624, 630, and 638, respectively. In step 606, the user equipment 204 registers both the circuit-switched interface 208 and the packet-switched interface 210 with the IMS 230. In step 624, prior to the circuit-switched interface 208 being powered down, the IMS 230 is instructed to forward calls originally directed to the circuit-switched network 220 to the packet-switched network 250. In steps 630 and 638, that call forwarding is cancelled.

Figure 7:
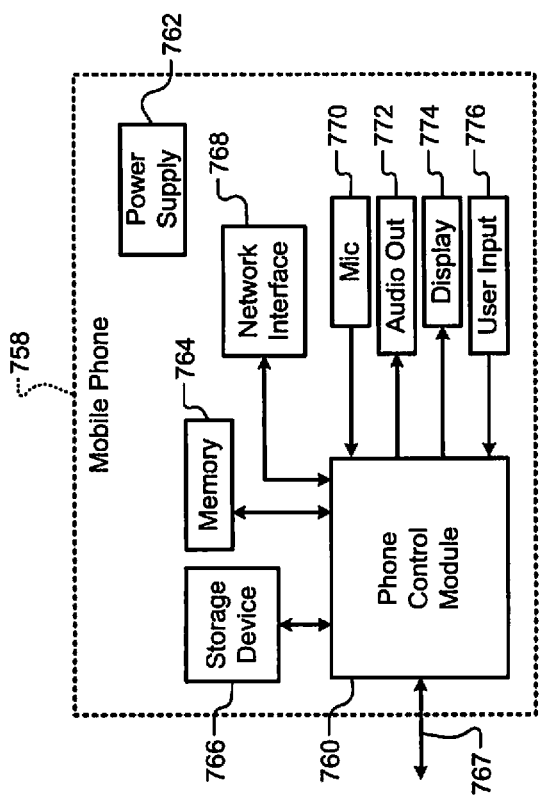
FIG. 7 is a functional block diagram of a mobile phone according to the principles of the present disclosure.

Referring now to FIG. 7, the teachings of the disclosure can be implemented in a network interface 768 of a mobile phone 758. The mobile phone 758 includes a phone control module 760, a power supply 762, memory 764, a storage device 766, and a network interface 767. The mobile phone 758 may include the network interface 768, a microphone 770, an audio output 772 such as a speaker and/or output jack, a display 774, and a user input device 776 such as a keypad and/or pointing device. The network interface 768 may include multiple physical layer interfaces, including cellular and wireless local area network. Because the network interface 768 includes a wireless interface, one or more antennas (not shown) may be included.

The phone control module 760 may receive input signals from the network interface 767, the network interface 768, the microphone 770, and/or the user input device 776. The phone control module 760 may process signals, including encoding, decoding, filtering, and/or formatting, and generate output signals. The output signals may be communicated to one or more of memory 764, the storage device 766, the network interface 767, the network interface 768, and the audio output 772.

Memory 764 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 766 may include an optical storage drive, such as a DVD drive, and/or a hard disk drive (HDD). The power supply 762 provides power to the components of the mobile phone 758.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A wireless device comprising:
a first wireless interface configured to communicate with a first access network, wherein the first wireless interface comprises a circuit-switched interface;
a second wireless interface configured to communicate with a second access network, wherein the second wireless interface comprises a packet-switched interface; and
a power control module configured to
(i) provide, to a remote system, first registration information, wherein the first registration information indicates to the remote system that calls are to be sent to the first wireless interface,
- (ii) in response to the first wireless interface being unused for at least a predetermined period of time, make a decision to disable the first wireless interface,
- (iii) in response to the decision to disable the first wireless interface, disable the first wireless interface,
- (iv) in response to the decision to disable the first wireless interface, but prior to disabling the first wireless interface, replace the first registration information at the remote system with second registration information, wherein the second registration information indicates to the remote system that calls are to be sent to the second wireless interface, and
- (v) in response to receiving an incoming call over the second wireless interface while the first wireless interface is disabled, re-enable the first wireless interface and replace the second registration information at the remote system with the first registration information.

2. The wireless device of claim 1, wherein the circuit-switched interface of the first wireless interface comprises a circuit-switched cellular interface.

3. The wireless device of claim 1, wherein the packet-switched interface of the second wireless interface comprises a packet-switched wireless local area network interface.

4. The wireless device of claim 1, wherein the power control module is configured to provide the first registration information and the second registration information to the remote system via the first access network.

5. The wireless device of claim 1, wherein the predetermined period of time is adjustable in response to a battery state of the wireless device.

6. The wireless device of claim 1, wherein the power control module is configured to periodically enable the first wireless interface to maintain communication with the first access network.

7. The wireless device of claim 1, wherein the power control module is configured to enable the first wireless interface in response to data for the first wireless interface being received over the second wireless interface.

8. The wireless device of claim 1, wherein the power control module is configured to provide the second registration information to the remote system in response to communication between the second wireless interface and the second access network being established.

9. The wireless device of claim 8, wherein the providing the second registration information causes the remote system to forward data destined for the first wireless interface to the second wireless interface.

10. The wireless device of claim 9, wherein the power control module is configured to cancel the forwarding in the remote system in response to the power control module re-enabling the first wireless interface.

11. The wireless device of claim 1, wherein the power control module is configured to, in response to an outgoing call being requested while the first wireless interface is disabled, (i) re-enable the first wireless interface, (ii) replace the second registration information at the remote system with the first registration information, and (iii) send the outgoing call over the first wireless interface.

12. The wireless device of claim 1, wherein the remote system is an internet protocol multimedia subsystem (IMS).

13. A method comprising:
- selectively establishing wireless communication between a first wireless interface and a first access network, wherein the first wireless interface comprises a circuit-switched interface;
- selectively establishing wireless communication between a second wireless interface and a second access network, wherein the second wireless interface comprises a packet-switched interface;
- providing, to a remote system, first registration information, wherein the first registration information indicates to the remote system that calls are to be sent to the first wireless interface;
- in response to the first wireless interface being unused for at least a predetermined period of time, making a decision to disable the first wireless interface;
- in response to the decision to disable the first wireless interface, disabling the first wireless interface;
- in response to the decision to disable the first wireless interface, but prior to disabling the first wireless interface, replacing the first registration information at the remote system with second registration information, wherein the second registration information indicates to the remote system that calls are to be sent to the second wireless interface; and
- in response to receiving an incoming call over the second wireless interface while the first wireless interface is disabled, (i) re-enabling the first wireless interface and (ii) replacing the second registration information at the remote system with the first registration information.

14. The method of claim 13, wherein the first wireless interface comprises a circuit-switched cellular interface.

15. The method of claim 13, wherein the second wireless interface comprises a packet-switched wireless local area network interface.

16. The method of claim 13, further comprising:
- performing the providing the first registration information to the remote system via the first access network; and
- performing the providing the second registration information to the remote system via the first access network.

17. The method of claim 13, further comprising adjusting the predetermined period of time in response to a battery state.

18. The method of claim 13, further comprising periodically enabling the first wireless interface to maintain communication with the first access network.

19. The method of claim 13, further comprising enabling the first wireless interface in response to data for the first wireless interface being received over the second wireless interface.

20. The method of claim 13, further comprising providing the second registration information to the remote system in response to communication between the second wireless interface and the second access network being established.

21. The method of claim 20, wherein the providing the second registration information causes the remote system to forward data destined for the first wireless interface to the second wireless interface.

22. The method of claim 21, further comprising cancelling the forwarding in the remote system in response to the first wireless interface being re-enabled.

23. The method of claim 13, further comprising, in response to an outgoing call being requested while the first wireless interface is disabled, (i) re-enabling the first wireless interface, (ii) replacing the second registration information at the remote system with the first registration information, and (iii) sending the outgoing call over the first wireless interface.

24. The method of claim 13, wherein the remote system is an Internet protocol multimedia subsystem (IMS).

25. The method of claim 13, further comprising, at the remote system, (i) in response to the incoming call and (ii) subsequent to replacing the second registration information at the remote system with the first registration information, transferring the incoming call to the first access network.

26. The method of claim 25, wherein the transferring the incoming call to the first access network comprises transferring the incoming call to the first wireless interface.

27. The method of claim 25, wherein the transferring the incoming call to the first access network comprises:
- initiating a second call to the remote system over the first access network; and
- at the remote system, joining the incoming call to the second call.

* * * * *